(12) United States Patent
Baek et al.

(10) Patent No.: US 9,181,411 B2
(45) Date of Patent: *Nov. 10, 2015

(54) RIGID POLYURETHANE FOAM HAVING EXCELLENT INSULATING PROPERTIES AND METHOD FOR PREPARING THE SAME

(75) Inventors: Kyung Hyun Baek, Suwon-si (KR); Jung Bae Jun, Hwaseong-si (KR); Jung Kyu Ju, Gunpo-si (KR)

(73) Assignee: Cheil Industries Inc., Gumi-si (KR)

(*) Notice: Subject to any disclaimer, the term of this patent is extended or adjusted under 35 U.S.C. 154(b) by 496 days.

This patent is subject to a terminal disclaimer.

(21) Appl. No.: 12/952,280

(22) Filed: Nov. 23, 2010

(65) Prior Publication Data

US 2011/0124753 A1 May 26, 2011

(30) Foreign Application Priority Data

Nov. 26, 2009 (KR) .................. 10-2009-0114962

(51) Int. Cl.
*C08G 18/48* (2006.01)
*C08J 9/14* (2006.01)
*C08J 9/12* (2006.01)
*C08J 9/32* (2006.01)

(52) U.S. Cl.
CPC .. *C08J 9/14* (2013.01); *C08J 9/127* (2013.01); *C08J 9/32* (2013.01); *C08J 2203/06* (2013.01); *C08J 2203/12* (2013.01); *C08J 2203/14* (2013.01); *C08J 2203/142* (2013.01); *C08J 2205/10* (2013.01); *C08J 2375/04* (2013.01)

(58) Field of Classification Search
CPC ............. C08J 9/14; C08J 9/127; C08J 9/32; C08J 2203/06; C08J 2203/12; C08J 2203/14; C08J 2203/142; C08J 2205/10; C08J 2375/04
USPC .............. 521/99, 131, 134, 137, 138, 170; 523/218, 219
See application file for complete search history.

(56) References Cited

U.S. PATENT DOCUMENTS

| | | | |
|---|---|---|---|
| 5,604,265 A | 2/1997 | De Vos et al. | |
| 6,166,109 A * | 12/2000 | Spitler et al. | 523/218 |
| 7,202,284 B1 | 4/2007 | Limerkens et al. | |
| 7,230,036 B2 | 6/2007 | Glorioso, Jr. et al. | |
| 7,435,762 B2 * | 10/2008 | Burgess et al. | 521/99 |
| 7,893,123 B2 * | 2/2011 | Luisi | 521/131 |
| 2004/0176486 A1 * | 9/2004 | Glorioso et al. | 521/56 |
| 2005/0079352 A1 | 4/2005 | Glorioso et al. | |
| 2005/0154072 A1 | 7/2005 | Suck et al. | |
| 2011/0124753 A1 | 5/2011 | Baek et al. | |

FOREIGN PATENT DOCUMENTS

| | | |
|---|---|---|
| JP | 10-168150 A | 6/1998 |
| JP | 2005-054163 A | 3/2005 |
| JP | 2005-088559 A | 4/2005 |
| KR | 10-2005-0073500 A | 7/2005 |
| KR | 2004-0034455 A | 7/2005 |
| KR | 10-0666110 B1 | 1/2007 |
| KR | 2009-114962 A2 | 6/2011 |
| WO | 00/44821 A1 | 8/2000 |
| WO | 02/096635 A1 | 12/2002 |
| WO | 2006/027671 A1 | 3/2006 |
| WO | 2007/045586 A1 | 4/2007 |
| WO | 2012/026654 A1 | 3/2012 |

OTHER PUBLICATIONS

International Search Report in commonly owned International Application No. PCT/KR2010/009550 dated Sep. 27, 2011, pp. 1-2.
Chinese Office Action in commonly owned Chinese Application No. 201080068767.8 dated Nov. 5, 2013, pp. 1-7.
Extended European Search Report in commonly owned European Application No. 10856479.0 dated Jun. 13, 2014, pp. 1-11.
Office Action in commonly owned U.S. Appl. No. 13/761,749 mailed Sep. 16, 2014, pp. 1-12.

* cited by examiner

*Primary Examiner* — John Cooney

(74) *Attorney, Agent, or Firm* — Additon, Higgins & Pendleton, P.A.

(57) ABSTRACT

The present invention provides rigid polyurethane foam comprising thermally expandable particles which are displaced to penetrate a strut of a structure of the polyurethane foam so that the particles are exposed into one or more cells of the polyurethane foam during foaming. Further, the rigid polyurethane foam can comprise hollow thermally expanded particles which are displaced to penetrate a surface of a cell in the polyurethane foam so that the particles are exposed into one or more cells of the polyurethane foam during foaming. The rigid polyurethane of the present invention can have excellent insulating properties.

23 Claims, 4 Drawing Sheets

RIGID POLYURETHANE FOAM HAVING EXCELLENT INSULATING PROPERTIES AND METHOD FOR PREPARING THE SAME

CROSS-REFERENCE TO RELATED APPLICATION

This application claims priority from Korean Patent Application No. 2009-114962, which was filed in the Korean Intellectual Property Office on Nov. 26, 2009, the entire disclosure of which is incorporated herein by reference.

FIELD OF THE INVENTION

The present invention relates to rigid polyurethane foam and method for preparing the same.

BACKGROUND OF THE INVENTION

Generally, the heat insulating property ($\lambda_F$) of polyurethane foam can be represented by the following equation:

$$\lambda_F = \lambda_m + \lambda_g + \lambda_r$$

in which:
$\lambda m$ is the adiabatic index through a polymer matrix,
$\lambda g$ is the adiabatic index through a gas within a closed cell of the foam, and
$\lambda r$ is the adiabatic index through thermal radiation.

In the above equation, the heat insulating property of the gas $\lambda g$ refers to the adiabatic index of a gas component of a blowing agent existing in the polyurethane foam (the closed cell) and makes up to 60~70% of the total adiabatic index of polyurethane foam.

Chlorofluorocarbons (CFCs) are conventionally used as blowing agents in the production of foams. However, CFCs are regarded as detrimental to the environment and have a high Global Warming Potential (GWP) and a high Ozone Depletion Potential (ODP). Therefore the production and use of CFCs have recently been prohibited and CFCs are being replaced by non-halogenated blowing agents, like cyclopentane. However, when cyclopentane is used as a blowing agent, the polyurethane foam can have a low heat insulating function because cyclopentane has a higher gas adiabatic index than HCFCs (Cyclopentane: 0.012 kcal/m.h.° C. compared to HCFCs: 0.0094 kcal/m.h.° C.) and the foam can have a large closed cell size.

In the above equation, the heat insulating property of the solid (the polymer matrix) $\lambda m$ refers to the adiabatic index of the urethane resin comprising the rigid polyurethane foam and makes up 10~20% of the total adiabatic index of polyurethane foam. Also in the above equation, the heat insulating property of radiation $\lambda r$ refers to the radiation adiabatic index of the closed cell of polyurethane foam and makes up 20~30% of the total adiabatic index of polyurethane foam.

With regard to $\lambda g$, it is difficult to enhance the heat insulating property of the gas when using cyclopentane. Yet, as discussed herein, because chlorofluorocarbons are regarded as harmful to the environment, cyclopentane has been suggested as a substitute for CFCs. Further, with regard to $\lambda m$, unless the polyurethane foam per se is substituted, it can be difficult to improve its heat insulating properties. With regard to $\lambda r$, this can be lowered by decreasing the size of the closed cell.

Korean Patent Application No. 2004-0034455 is directed to methods for preparing rigid urethane foam. Polyurethane cell size is regulated by adding a nucleating agent such as perfluorinated alkene to enhance the heat insulating property of the rigid polyurethane foam. Although nucleating agents can enhance heat insulating properties, nucleating agents such as chlorofluorocarbons also can be harmful to the environment.

As discussed herein, because many halogen-based hydrocarbons blowing agents can be harmful to the environment, there is a growing need for non-halogenated hydrocarbon blowing agents. However, using a non-halogenated hydrocarbon such as cyclopentane may induce fire risk and increase*costs. U.S. Pat. No. 7,230,036 and International Application PCT/US02/16620 disclose the use of thermally expandable particles encapsulating a non-halogenated blowing agent in the production of foam. The '036 patent states that the risk of fire resulting from the use of a hydrocarbon blowing agent can be controlled by using the thermally expandable particle encapsulating the hydrocarbon. However, this patent does not identify or address issues associated with improving the heat insulating property of the foam.

SUMMARY OF THE INVENTION

The present invention can provide rigid polyurethane foam having excellent heat insulating properties.

The present invention can further provide rigid polyurethane foam having a small size cell and a homogeneous cell structure.

The present invention can further provide methods for preparing the rigid polyurethane foam having excellent heat insulating properties and which can regulate closed cell size.

To solve the above problems, in the present invention, a rigid polyurethane foam is made using thermally expandable particles which are displaced during foaming to penetrate a strut (cell wall) of the polyurethane foam structure so that the resultant thermally expanded particles are exposed into one or more cells of the polyurethane foam.

Exemplary embodiments of the invention include a rigid polyurethane foam precursor composition including the thermally expandable particles and a polyurethane foam precursor material. The polyurethane foam precursor material can include any of the precursor materials known in the art for the production of polyurethane foam, such as one or more polyols and/or isocyanates.

Other exemplary embodiments of the present invention include a rigid polyurethane foam comprising hollow thermally expanded particles which have been displaced during foaming to penetrate a surface of a cell wall in the polyurethane foam so that the thermally expanded particles are exposed into one or more cells of the polyurethane foam.

The polyurethane foam precursor composition and/or the resultant rigid polyurethane foam includes the thermally expandable and/or thermally expanded particles in an amount of about 0.5 to about 10 parts by weight, per 100 parts by weight of the polyurethane foam precursor material and/or polyurethane resin forming the polyurethane foam. Stated differently, the polyurethane foam precursor composition can include the thermally expandable particles in an amount of about 0.5 to about 10 parts by weight, per 100 parts by weight of the polyurethane foam precursor material (such as one or more polyols and/or isocyanates used to make the polyurethane foam), and the resultant rigid polyurethane foam can include thermally expandable and/or thermally expanded particles in an amount of about 0.5 to about 10 parts by weight, per 100 parts by weight of the polyurethane resin forming the polyurethane foam.

In exemplary embodiments of the present invention, the cells of the polyurethane foam are formed by foaming with a non-encapsulated blowing agent (also referred to as a non-encapsulated foaming agent). The non-encapsulated blowing agent can be a hydrocarbon based foaming compound, methylene chloride, hexane, acetone, water or a mixture of two or more thereof.

The weight ratio between the non-encapsulated blowing agent and the thermally expandable particles can be about 1:0.2 to about 1:2.

The mean diameter of the cells of the polyurethane foam can be about 100 to about 400 µm.

The mean volume diameter of the thermally expandable particles before being foamed can be about 5 to about 40 µm.

The thermally expandable particles can be polymer particles containing or encapsulating a hydrocarbon based foaming agent (also referred to as an encapsulated foaming agent or encapsulated blowing agent), which can be in addition to the non-encapsulated blowing agent noted above, wherein the boiling point of the hydrocarbon based foaming agent can be about −10 to about 50° C. and wherein the glass transition temperature (Tg) of the polymer particles can be about 40 to about 100° C.

The rigid polyurethane foam can be used in insulation for a refrigerator.

The present invention also relates to a method for preparing rigid polyurethane foam, comprising:

dispersing thermally expandable particles in a polyol mixture including a dispersing agent, a catalyst and water; adding a non-encapsulating blowing agent to the polyol mixture including the thermally expandable particles dispersed therein; and reacting isocyanate and the polyol mixture including the thermally expandable particles and the non-encapsulated blowing agent under conditions sufficient to form a polyurethane foam, wherein the amount of the thermally expandable particles is about 0.5 to about 10 parts by weight, per 100 parts by weight of the urethane resin forming the polyurethane foam, and wherein the mixture weight ratio between the non-encapsulated blowing agent and the thermally expandable particles is about 1:0.2 to about 1:2. The mean volume diameter of the thermally expandable particle before being foamed can be about 5 to about 40 µm.

BRIEF DESCRIPTION OF THE DRAWINGS

These and/or other aspects and advantages of the invention will become apparent and more readily appreciated from the following description of the embodiments, taken in conjunction with the accompanying drawing of which.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a rigid polyurethane foam precursor composition comprising thermally expandable particles which are displaced during foaming to penetrate a strut (cell wall) of a structure of the polyurethane foam so that the particles are exposed into one or more cells of the polyurethane foam.

The thermally expandable particles can be displaced to penetrate a surface of a cell in polyurethane foam. Accordingly, the present invention further provides a rigid polyurethane foam comprising hollow thermally expanded particles which are displaced during foaming and penetrate a surface of a cell in the polyurethane foam so that the particles are exposed into one or more cells of the polyurethane foam.

The thermally expandable particle can foam above a certain temperature and may be dispersed in a polyol and/or isocyanate to form cells in polyurethane foam. The thermally expandable particles may regulate cell size of urethane foam by being caught in cells so that the rigid polyurethane foam of the present invention has a structure which is totally different from a structure of existing rigid polyurethane foam. In this manner, the thermally expandable particles can regulate the size of the cells by suppressing the expansion thereof.

In other words, the structure of the rigid polyurethane foam of the present invention is formed by a thermally expandable particle penetrating (partially or wholly) a cell wall so that the thermally expandable particle is embedded (stuck) in the cell structure of the urethane foam. The structure of the rigid polyurethane foam of the present invention may also be formed by the thermally expandable particle and a non-encapsulated blowing agent competitively foaming during foaming so that the rigid polyurethane foam can have an appropriate cell size.

Figure 1:
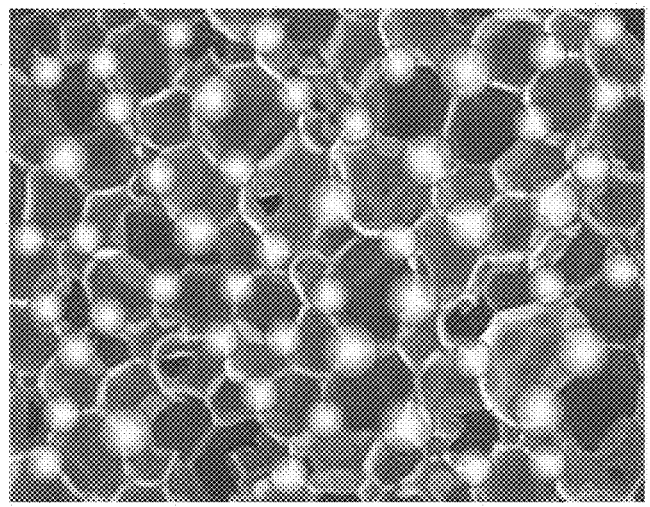
FIG. 1 is an image of a rigid polyurethane foam in accordance with an embodiment of the present invention.

FIG. 1 illustrates a structure such as described above of a rigid polyurethane foam according to the present invention. The blue colored sphere indicates a foamed thermally expanded particle.

Thus, the rigid polyurethane foam according to the present invention can lower the adiabatic index through thermal radiation by regulating the cell size so that the heat insulating property of the foam itself can be improved. Also, the rigid polyurethane foam of the present invention uses a thermally expandable particle that can include a hydrocarbon based blowing agent including an environmental friendly material to regulate the cell size thereof (which hydrocarbon based blowing agent can be referred to as an encapsulated blowing agent or encapsulated foaming agent). Therefore the rigid polyurethane foam of the present invention can be environmentally friendly because it does not require a CFC blowing agent and/or a nucleating agent such as a perfluorinated alkene.

The rigid polyurethane foam according to the present invention is capable of being prepared by the following method.

The amount of the thermally expandable particles is about 0.5 to about 10 parts by weight per 100 parts by weight of urethane resin forming the polyurethane foam and the weight ratio between the non-encapsulated blowing agent and the thermally expandable particles is about 1:0.2 to about 1:2. In some embodiments, the amount of the thermally expandable particles can range from an amount of about 0.5, 0.6, 0.7, 0.8, 0.9, 1, 2, 3, 4, 5, 6, 7, 8, 9, and 10 parts by weight. Further, according to some embodiments of the present invention, the amount of thermally expandable particles can be in a range from about any of the foregoing amounts to about any other of the foregoing amounts.

When the amount of the thermally expandable particles is less than about 0.5 parts by weight per 100 parts by weight of urethane resin forming the polyurethane foam, the cell size of the urethane foam may not be regulated effectively. When the amount of the thermally expandable particles exceeds about 10 parts by weight per 100 parts by weight of urethane resin forming the polyurethane foam, the cell size of the urethane foam also may not be regulated effectively and the effect of improving the adiabatic index may be reduced by increasing solid adiabatic index following rise of density.

The weight ratio between the non-encapsulated blowing agent and the thermally expandable particles can be about 1:0.2 to about 1:2. The foaming property of the thermally expandable particles can be improved by regulating the amount of a non-encapsulated blowing agent to thereby promote the absorption of more of the heat required to foam a thermally expandable particle. When a non-encapsulated blowing agent is included in an amount less than the above range, the foaming property of urethane foam may be deteriorated. When a non-encapsulated blowing agent is included in an amount greater than the above range, the excess blowing agent can absorb the heat of reaction from the polyurethane reaction, which can cause problems in foaming the thermally expandable particles.

The mean volume diameter of the thermally expandable particles before being foamed can be about 5 to about 40 μm. In some embodiments, the mean volume diameter of the thermally expandable particles can range from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 μm. Further, according to some embodiments of the present invention, the mean volume diameter of the thermally expandable particles can range from about any of the foregoing sizes to about any other of the foregoing sizes.

In exemplary embodiments of the rigid polyurethane foam of the present invention, the mean diameter of the cells of the polyurethane foam can be about 100 to about 400 μm.

The thermally expandable particle is a particle that expands if a certain amount of heat is applied. The expansion starting temperature (Tstart) and the maximum expansion temperature (Tmax) is determined by the glass transition temperature (Tg) of a polymer material forming outer shape (surface) of the particle and the boiling temperature of the hydrocarbon based foaming agent. Also, maximum expansive displacement (Dmax) is regulated by an amount of hydrocarbon based foaming agent and gas transmission property of the polymer material (Gas barrier).

With regard to the rigid polyurethane foam of the present invention, the thermally expandable particles are polymer particles containing or encapsulating a hydrocarbon based foaming agent, wherein the boiling point of the hydrocarbon based foaming agent is about −10 to about 50° C. and wherein the glass transition temperature (Tg) of the polymer particles forming the outer surface of the thermally expandable particles is about 40 to about 100° C. Exemplary encapsulated hydrocarbon based foaming agents can include without limitation normal pentane, isopentane and the like, and combinations thereof.

In some embodiments, the boiling point of the hydrocarbon based foaming agent can be −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50° C. Further, according to some embodiments of the present invention, the boiling point of the hydrocarbon based foaming agent can range from about any of the foregoing temperatures to about any other of the foregoing temperatures.

In some embodiments, the glass transition temperature (Tg) of the polymer particles forming the outer surface of the thermally expandable particles can be 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100° C. Further, according to some embodiments of the present invention, the glass transition temperature (Tg) of the polymer particles forming the outer surface of the thermally expandable particles can range from about any of the foregoing temperatures to about any other of the foregoing temperatures.

The expansion starting temperature (Tstart) of thermally expandable particles used in the rigid polyurethane foam of the present invention can be 50 to 110° C., the maximum expansion temperature (Tmax) can be 60 to 140° C., for example 70 to 120° C., and the maximum expansive displacement (Dmax) can be more than 500 μm, for example more than 1000 μm.

In some embodiments, the expansion starting temperature (Tstart) of the thermally expandable particles can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110° C. Further, according to some embodiments of the present invention, the expansion starting temperature (Tstart) of thermally expandable particles can range from about any of the foregoing temperatures to about any other of the foregoing temperatures.

In some embodiments, the maximum expansion temperature (Tmax) of the thermally expandable particles can be 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140° C. Further, according to some embodiments of the present invention, the maximum expansion temperature (Tmax) of the thermally expandable particles can range from about any of the foregoing temperatures to about any other of the foregoing temperatures.

The thermally expandable polymer particles can include a homo- or copolymer including one or more monomers such as but not limited to nitrile monomers, (meth)acrylate monomers, halogenated monomers, maleic anhydride, and the like, and combinations thereof. Exemplary nitrile monomers include acrylonitrile, methacrylonitrile, and the like. Exemplary (meth)acrylate monomers include methyl methacrylate, methyl acrylate, ethyl acrylate, propyl acrylate, n-butyl acrylate, iso-butyl acrylate, t-butyl acrylate, 2-ethyl-hexyl acrylate, n-octyl acrylate, and the like. Exemplary halogenated monomers include vinylidene chloride. The thermally expandable polymer particles can further include a multi-functional crosslinking agent such as dipentaerythritol hexaacrylate. The thermally expandable polymer particles can be prepared as discussed in more detail herein.

The non-encapsulated blowing agent in the rigid polyurethane foam of the present invention may be a hydrocarbon based foaming agent having a boiling point of room temperature as well as cyclopentane used in preparing existing polyurethane foam. Exemplary hydrocarbon based foaming agents include without limitation normal pentane, isopentane and the like, and combinations thereof. Also, the non-encapsulated blowing agent can include a physical blowing agent using the heat of the urethane reaction, such as, not limited in, methylene chloride, hexane, acetone and the like, and combinations thereof, and/or a chemical blowing agent which can generate $CO_2$ by way of reacting water and isocyanate. Further, a mixture of two or more of the foregoing blowing agents can be used.

The rigid polyurethane foam of the present invention can have enhanced insulating properties and can be suitable for use as an insulating material for a variety of applications, such as but not limited to refrigerators, freezers, construction applications, vehicles and the like.

In exemplary embodiments of the invention, the rigid polyurethane foam can have a K-factor of about 150 to about 180, for example about 160 to about 170 $10^{-4}$ kcal/m·h·° C. In some embodiments, the K-factor can be about 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or 180 $10^{-4}$ kcal/m·h·° C. Further, according to some embodiments of the present invention, the K-factor can range from about any of the foregoing amounts about any other of the foregoing amounts.

In exemplary embodiments of the invention, the rigid polyurethane foam can have a cell size of about 250 μm to about 350 μm, for example about 275 μm to about 325 μm, and as another example about 280 μm to about 315 μm. In some embodiments, the cell size can be about 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, or 350 μm. Further, according to some embodiments of the present invention, the cell size can range from about any of the foregoing sizes about any other of the foregoing sizes.

In exemplary embodiments of the invention the rigid polyurethane foam can have a foam density of about 25 g/cm³ to about 40 g/cm³, for example about 30 g/cm³ to about 35 g/cm³. In some embodiments, the foam density can be about 25, 26, 27, 28, 29, 30, 31, 32, 33, 34, 35, 36, 37, 38, 39, or 40 g/cm³. Further, according to some embodiments of the present invention, the foam density can range from about any of the foregoing amounts about any other of the foregoing amounts.

In exemplary embodiments of the invention, the rigid polyurethane foam of the invention can have a close cell ratio of about 88% to about 95%, for example about 90% to about 93%. In some embodiments, the close cell ratio can be about 88, 89, 90, 91, 92, 93, 94, or 95%. Further, according to some embodiments of the present invention, the close cell ratio can range from about any of the foregoing amounts about any other of the foregoing amounts.

The present invention also provides a method for preparing a rigid polyurethane foam, comprising dispersing thermally expandable particles in a polyol mixture including a dispersing agent, a catalyst and water; preparing the polyol mixture by adding a non-encapsulated blowing agent to the polyol mixture with the thermally expandable particles dispersed therein; and foaming a resin composition by the heat of the reaction between isocyanate and the polyol mixture including the thermally expandable particles and the non-encapsulated blowing agent, wherein the amount of the thermally expandable particles is about 0.5 to about 10 parts by weight per 100 parts by weight of the urethane resin, and wherein the mixture weight ratio between the non-encapsulated blowing agent and the thermally expandable particles is about 1:0.2 to about 1:2.

The rigid polyurethane foam of the present invention having the structure as mentioned above can be prepared by way of the above method.

According to the method for preparing a rigid polyurethane foam of the present invention, the mean volume diameter of the thermally expandable particles before being foamed is about 5 to about 40 μm.

The thermally expandable particles can be polymer particles including or encapsulating a hydrocarbon based foaming agent, wherein the boiling point of the encapsulated hydrocarbon based foaming agent is about −10 to about 50° C. and wherein the glass transition temperature (Tg) of the polymer forming the outer surface of the particles is about 40 to about 100° C.

The expansion starting temperature (Tstart) of thermally expandable particles used in the rigid polyurethane foam of the present invention can be 50 to 110° C., the maximum expansion temperature (Tmax) can be 60 to 140° C., for example 70 to 120° C., and the maximum expansive displacement (Dmax) can be more than 500, for example more than 1000.

The non-encapsulated blowing agent in the rigid polyurethane foam of the present invention may be a hydrocarbon based foaming agent having a boiling point of room temperature as well as cyclopentane used in preparing existing polyurethane foam. Exemplary hydrocarbon based foaming agents can include without limitation normal pentane, isopentane and the like, and combinations thereof. Also, the non-encapsulated blowing agent can be a physical blowing agent using the heat of the reaction to form the urethane such as, but not limited to, methylene chloride, hexane, acetone and the like, and combinations thereof, and/or a chemical blowing agent having the property of generating $CO_2$ by way of reacting water and isocyanate. Further, a mixture of two or more of the blowing agents can be used.

The rigid polyurethane foam prepared by the method of the present invention can include cells with a mean diameter of about 100 to about 400 μm.

The invention may be better understood by reference to the following examples which are intended for the purpose of illustration and are not to be construed as in any way limiting the scope of the present invention, which is defined in the claims appended hereto.

EXAMPLES

Preparation of the Thermally Expandable Particles

Preparation Example 1

An oil mixture is prepared mixing 64 g of vinylidene chloride (VDC), 64 g of acrylonitrile (AN), 16 g of methylacrylate (MA), 16 g of methyl methacrylate, 0.3 g of dipentaerythritol hexaacrylate (DPEHA), 16 g of isopentane, 16 g of normal pentane and 1.6 g of di-2-ethylhexylperoxydicarbonate (OPP).

A mixture is prepared by adding 450 g of ion-exchanged water, 108 g of sodium chloride, 36 g of colloidal silica (Ludox-AM), 0.5 g of polyvinylpyrrolidone and 1.2 g of aqueous solution containing 1% of sodium nitrite and an aqueous dispersed liquid is prepared by adjusting the pH value of the mixture to 3.

The aqueous dispersed liquid and the oil mixture prepared above are mixed, and a suspension is prepared by dispersing the mixture which is rigorously mixed by a homomixer (HO-MOMIXER 2.5, Primix) at a speed 5,000 rpm. The suspension is immediately transferred to a pressure reactor having a capacity of 1 L which had been purged with nitrogen and sealed. The reaction mixture is maintained at a temperature of 60° C. for 20 hours under rotation of 400 rpm and initial pressure of the reaction of 3 kgf/cm². The obtained product is filtrated, washed, and dried to prepare a thermally expandable particle.

Preparation Examples 2-7

Thermally expandable particles are prepared in the same way as described in preparation Example 1 and table 1 which shows the composition and conditions of the suspension polymerization.

TABLE 1

|   | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| VDC | 64 | 64 | 64 | — | 112 | — | 64 |
| AN | 64 | 64 | 64 | 80 | 32 | 104 | 64 |
| MAN | — | — | — | 16 | — | 16 | — |
| MA | 16 | 16 | 16 | — | 8 | 24 | 16 |
| EA | — | — | — | 48 | — | — | — |
| MMA | 16 | 16 | 16 | 16 | 8 | 16 | 16 |
| DPEHA | 0.3 | 0.3 | 0.3 | 0.3 | 0.3 | 0.3 | 0.3 |
| iso-Pentane | 16 | 16 | 16 | 16 | 12 | 16 | 16 |
| n-Pentane | 16 | 16 | 16 | 16 | 12 | 16 | 16 |
| OPP | 1.6 | 1.6 | 1.6 | 1.6 | 1.6 | 1.6 | 1.6 |
| Suspension stirring rate (RPM) | 5000 | 7000 | 4000 | 6000 | 5000 | 6000 | 3000 |

*MAN: maleic anhydride
*EA: ethyl acetate

Table 2 below analyzes the diameter of thermally expandable particles prepared by the foregoing Preparation Examples.
- Analysis method of the thermally expandable particles: analyzing diameter of particle
- The diameter of particle before foaming: The mean volume diameter and distribution (C.V, coefficient of variation) of the particles are analyzed by a particle size analyzer (LS 13320, Bekman coulter) that is a laser diffraction type.
- The diameter of particle after foaming: An expanded particle is observed by an optical microscope (BX51, OLYPUS) after maintaining within an oven for 3 minutes at Tmax. The mean volume diameter of an expanded particle is analyzed using an image analyzing machine (TOMORO scopeeye 3.6, SARAM SOFT).

Example 1

Rigid urethane foam is prepared by a method of HandMix in a vertical mold (250×250×50) (unit: mm).

A dispersing agent, catalyst, water and polyol are mixed in the mixing ratios set forth in table 3 below. A thermally expandable particle prepared by Preparation Example 1 is added thereto, and the mixture is dispersed by using a rotation-revolution type disperser. A polyol mixture is made by adding a blowing agent to the polyol mixture in which the thermally expandable particles are dispersed.

An isocyanate is added to the polyol mixture containing the thermally expandable particles in a certain weight ratio (polyol mixture:isocyanate=100:118), and thereafter the mixture is mixed using a homomixer (Homo Disper 2.5, Primix) at speeds of 5,000 rpm for 5 seconds so that the mixture reacts as it is injected into a vertical mold.

TABLE 3

|   | Type | Contents (unit: parts by weight) |
|---|---|---|
| Premixed Polyol | Toluene diamine-based polyol (OH value: 350~550) | 60.0 |
|  | Sucrose glycerine-based polyol (OH value: 360~490) | 20.0 |
|  | Trimethylolpropane-based polyol (OH value: 350~450) | 10.0 |

TABLE 2

|   | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| the diameter of particle before foaming (μm) | 26.8 | 13.3 | 35.0 | 25.3 | 25.8 | 27.2 | 49.9 |
| C.V (%) | 45.5 | 33.6 | 68.6 | 43.2 | 43.5 | 48.3 | 60.3 |
| the diameter of particle after foaming (μm) | 125.6 | 78.3 | 170.2 | 130.2 | 120.3 | 130.8 | 231.5 |
| Tstart (° C.) | 75 | 79 | 73 | 74 | 62 | 92 | 69 |
| Tmax (° C.) | 105 | 108 | 102 | 106 | 91 | 142 | 107 |
| Dmax (μm) | 2332 | 2560 | 2625 | 2103 | 1832 | 2325 | 2525 |

TABLE 3-continued

| Type | Contents (unit: parts by weight) |
|---|---|
| Glycerine-based polyol (OH: 168~670) | 10.0 |
| dispersing agent* | 2.5 |
| catalyst** | 2.0 |
| Water | 1.95 |
| blowing agent (Cyclo-pentane) | 16.5 |
| isocyanate (MDI, amino equivalent: 135) | 145.1 |

*dispersing agent: Polyether-polydimethylsiloxane copolymer
**catalyst: amine catalyst Examples 2-11

Rigid urethane foam is prepared in the same manner as Example 1 described above except for using the components of table 4 and table 5.

Table 4 and table 5 show the cell size of urethane foam, density of urethane foam, K-factor and Cell Close ratio of Examples 1-11.

Figure 2A:
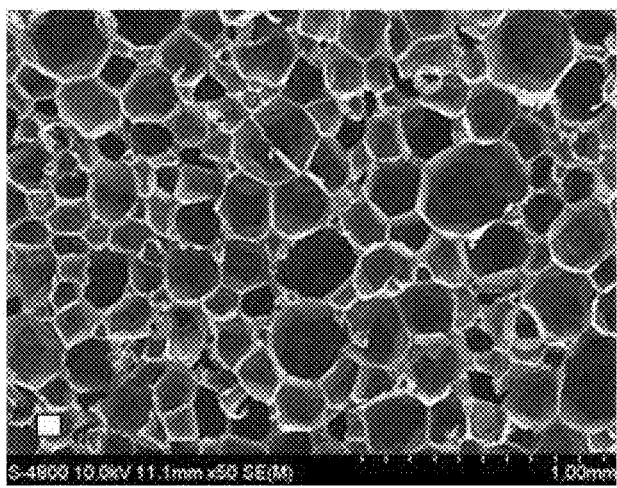
FIG. 2a and FIG. 2b are scanning electron microscope images of a rigid urethane foam prepared in accordance with another embodiment of the present invention.
Figure 2B:
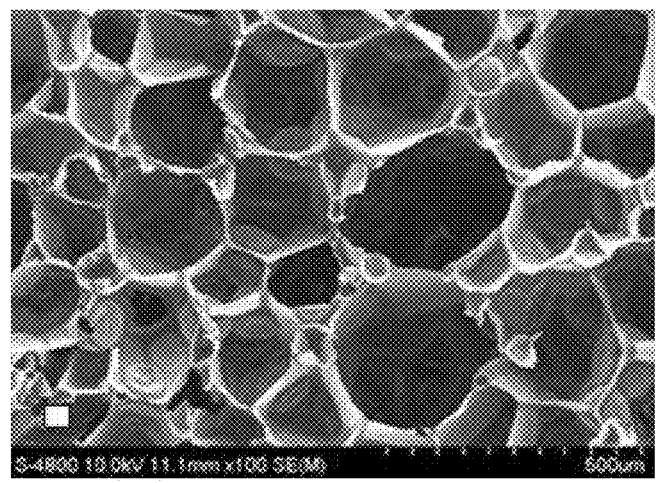

FIG. 2a and FIG. 2b is a scanning electron microscope image of rigid urethane foam prepared in Example 2.

TABLE 4

|  |  | Example 1 | Example 2 | Example 3 | Example 4 | Example 5 | Example 6 |
|---|---|---|---|---|---|---|---|
| Polyol |  | 100.0 | 100.0 | 100.0 | 100.0 | 100.0 | 100.0 |
| Dispersing agent |  | 2.5 | 2.5 | 2.5 | 2.5 | 2.5 | 2.5 |
| Catalyse |  | 2.0 | 2.0 | 2.0 | 2.0 | 2.0 | 2.0 |
| Water |  | 1.9 | 1.9 | 1.9 | 1.9 | 1.9 | 1.9 |
| Blowing agent |  | 16.5 | 16.5 | 16.5 | 16.5 | 16.5 | 16.5 |
| MDI |  | 145.1 | 145.1 | 145.1 | 145.1 | 145.1 | 145.1 |
| Thermal expansion particle | Type | Preparation Example 1 | Preparation Example 1 | Preparation Example 1 | Preparation Example 2 | Preparation Example 3 | Preparation Example 4 |
|  | Contents (%)* | 12.5 | 12.5 | 12.5 | 10.0 | 15.0 | 12.5 |
| Blowing Temperature (° C.) |  | 40 | 80 | 120 | 80 | 80 | 80 |
| Cell size (μm)** |  | 299 | 288 | 282 | 295 | 292 | 281 |
| Foam density (g/cm$^3$) |  | 32.1 | 32.4 | 32.2 | 32.8 | 31.9 | 31.4 |
| K-Factor*** |  | 167.2 | 165.3 | 163.9 | 167.8 | 166.9 | 164.6 |
| Cell Close ratio |  | 93.8 | 92.6 | 92.0 | 90.7 | 90.2 | 93.4 |

TABLE 5

|  |  | Example 7 | Example 8 | Example 9 | Example 10 | Example 11 |
|---|---|---|---|---|---|---|
| Polyol |  | 100.0 | 100.0 | 100.0 | 100.0 | 100.0 |
| Dispersing agent |  | 2.5 | 2.5 | 2.5 | 2.5 | 2.5 |
| Catalyst |  | 2.0 | 2.0 | 2.0 | 2.0 | 2.0 |
| Water |  | 1.9 | 1.9 | 1.9 | 1.9 | 1.9 |
| Blowing agent |  | 16.5 | 16.5 | 16.5 | 12.0 | 12.0 |
| MDI |  | 145.1 | 145.1 | 145.1 | 145.1 | 145.1 |
| Thermal expansion particle | Type | Preparation Example 5 | Preparation Example 1 | Preparation Example 1 | Preparation Example 1 | Preparation Example 5 |
|  | Contents (%)* | 12.5 | 5.0 | 20.0 | 12.5 | 12.5 |
| Blowing Temperature (° C.) |  | 80 | 80 | 80 | 80 | 80 |
| Cell size (μm)* |  | 283 | 315 | 297 | 288 | 273 |
| Foam density (g/cm$^3$) |  | 31.5 | 32.2 | 32.6 | 31.5 | 30.0 |
| K-Factor** |  | 163.2 | 168.8 | 166.3 | 163.3 | 162.5 |
| Cell Close ratio |  | 93.2 | 90.5 | 92.2 | 93.5 | 93.8 |

*Urethane foam Cell Size
**K-Factor unit: $10^{-4}$ kcal/m · h · ° C.

Comparative Examples 1 to 6

Rigid urethane foam is prepared in accordance with the method of Example 1 as described above except for using the components of table 6.

Table 6 shows the cell size of urethane foam, density of urethane foam, K-factor and Cell Close ratio of Comparative Example 1-6.

TABLE 6

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Polyol | 100.0 | 100.0 | 100.0 | 100.0 | 100.0 | 100.0 |
| Dispersing agent | 2.5 | 2.5 | 2.5 | 2.5 | 2.5 | 2.5 |
| Catalyst | 2.0 | 2.0 | 2.0 | 2.0 | 2.0 | 2.0 |
| Water | 1.9 | 1.9 | 1.9 | 1.9 | 1.9 | 1.9 |
| Blowing agent | 16.5 | 16.5 | 16.5 | 16.5 | 16.5 | 16.5 |
| MDI | 145.1 | 145.1 | 145.1 | 145.1 | 145.1 | 145.1 |
| Thermal expansion particle Type | — | — | — | Preparation Example 6 | Preparation Example 7 | Preparation Example 1 |
| Thermal expansion particle Contents (%)* | | | | 12.5 | 15.0 | 30.0 |
| Blowing Temperature (° C.) | 40 | 80 | 120 | 80 | 80 | 80 |
| Cell size (μm) | 362 | 405 | 415 | 402 | 423 | 387 |
| Foam density (g/cm³) | 32.8 | 31.9 | 30.8 | 31.7 | 31.7 | 33.2 |
| K-Factor | 171.8 | 178.9 | 179.9 | 179.3 | 181.2 | 179.3 |
| Cell Close ratio | 93.7 | 93.2 | 93.2 | 91.4 | 87.3 | 88.3 |

Figure 4:
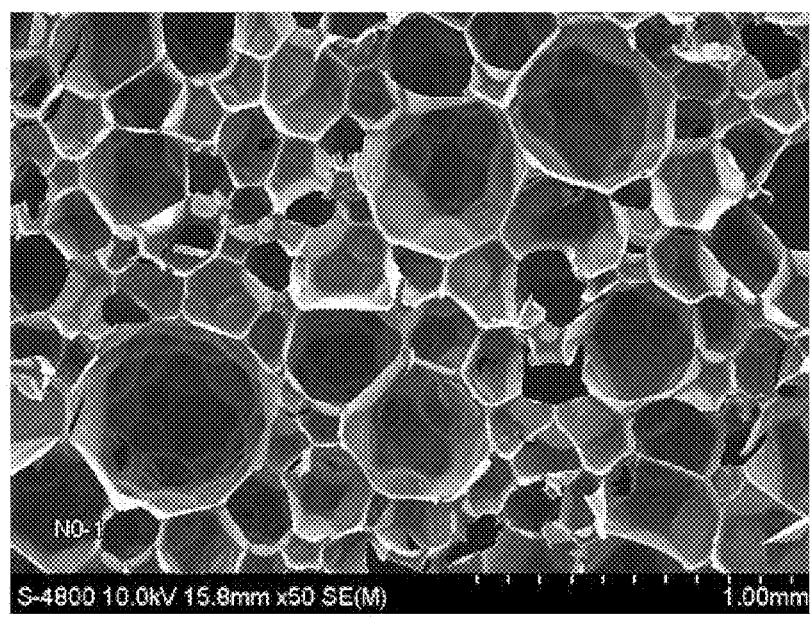
FIG. 4 is a scanning electron microscope image of polyurethane foam prepared in accordance with Comparative Example 1.

FIG. 4 is a scanning electron microscope image of polyurethane foam prepared in accordance with Comparative Example 1.

The property measurements of the rigid polyurethane foam of Examples 1-11 and Comparative Example 1-6 are as below.

[Adiabatic Index, K-Factor]

The urethane foam prepared by employing a method of HandMix is tailored by a standard size of 200×200×25 and then the thermal conductivity is analyzed by using a thermal conductivity analyzer (HC-074, EKO). The thermal conductivity is measured according to the ASTM-C518 method guarded heat flow meter method.

[Cell Size]

After the urethane foam is observed by magnifying 50 times using a scanning electron microscope (S4800, Hitach), the cell size of the urethane foam is analyzed by the volume mean diameter using an image analyzer (TOMORO scopeeye 3.6, SARAM SOFT)

[Cell Close Ratio]

Cell Close ratio represents the percentage of closed cells among cells of urethane foam. Cell Close ratio is analyzed by using an Ultrapycnomter 1000 (Quantachrome) on a foam tailored by a standard size of 25×25×25.

[Analysis of Thermally Expandable Property]

Analyzing instrument TMA Q-400 (Thermomechanical Analyzer, TA Instrument) is used in the analysis. 1.0 mg of a thermally expandable particle is placed in an aluminum pan with a diameter of 6.7 mm and a depth of 4.5 mm and covered by an aluminum pan with a diameter of 6.5 mm and a depth of 4.0 mm to prepare a sample. While applying a force of 0.05 N to a probe using a TMA Expansion Probe form, the temperature is heated from room temperature to 200° C. at a heating speed of 5° C./min and the vertical displacement of the probe is analyzed.

Expansion starting temperature (Tstart): A temperature at which the probe displacement starts Maximum expansion temperature (Tmax): A temperature at which the probe displacement is maximum maximum expansive displacement (Dmax): Displacement at which the probe displacement is maximum (μm)

Figure 3:
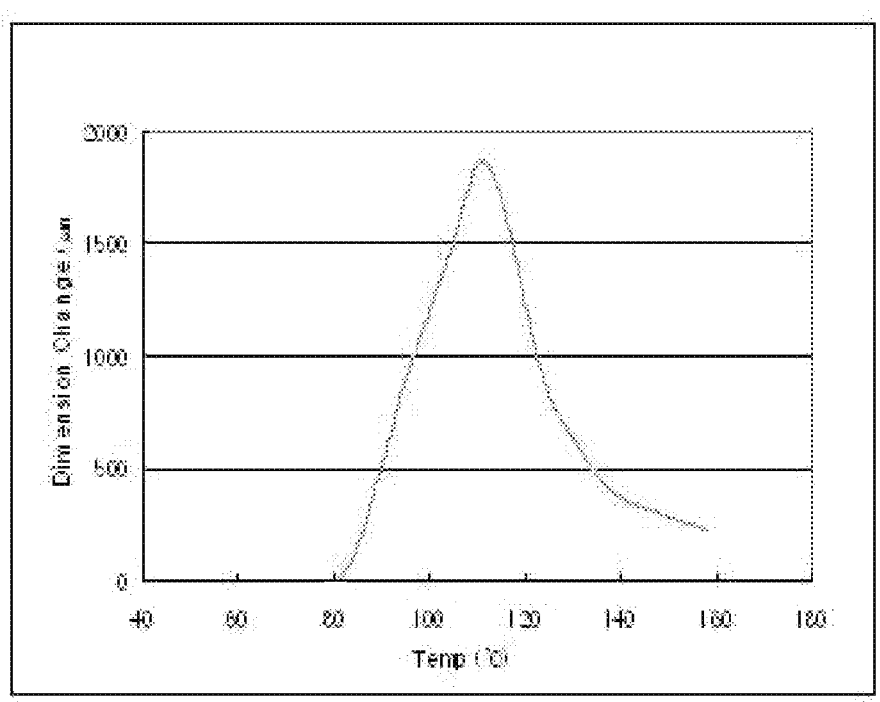
FIG. 3 is a graph representing the thermal expansion property (TMA) of a thermally expandable particle prepared by controlling the composition thereof and conditions of the suspension polymerization method used to make the same.

FIG. 3 is a graph which illustrates the thermal expansion property (TMA) of a thermally expandable particle, obtained as described above.

Effect of expansion temperature (Examples 1-3, Comparative Examples 1-3)

As the expansion temperature increases, the amount of heat the thermally expandable particle absorbs increases and, thereby, the expansiveness increases and the decreasing effect of the cell size increases, leading to a superior K-factor value.

As the expansion temperature for preparing an urethane foam without thermally expandable particles increases, the pressure of the blowing agent increases which results in a non-homogeneous cell structure, leading to deterioration of the insulation properties.

Diameter of a thermally expandable particle (Examples 2, 4-5, Comparative Example 5)

When the diameter of the thermally expandable particle is within an appropriate size (10-40 μm), the thermally expandable particle is homogeneously distributed in the urethane foam and the cells are formed homogeneously, leading to an effect of decreasing the K-factor. However, when the diameter of the thermally expandable particle is larger than the appropriate size (10-40 μm), the cell structure is nonhomogeneous and, thereby, the K-factor increases.

Composition of a thermally expandable particle (Example 6)

Although the monomer composition of the thermally expandable particle is different, when the thermal expansion properties are identical, the decreasing effect of the cell size applied to the urethane foam is similar.

Expansion temperature of a thermally expandable particle (Example 7, Comparative Example 4)

When the expansion starting temperature of a thermally expandable particle (Tstart) and the maximum expansion temperature (Tmax) is lowered, the K-factor value is excellent as exhibited by the ability to sufficiently expand the particle at a relatively low temperature (80° C., mold temperature).

With regard to a thermally expandable particle (EMP-5), when the expansion starting temperature (Tstart) is more than 90° C. and the maximum expansion temperature (Tmax) is more than 140° C., the K-factor following introducing the thermally expandable particle did not exhibit this effect and consequently did not expand sufficiently at 80° C., mold temperature.

Amount of a thermally expandable particle (Examples 8-9, Comparative Example 6)

When the amount of the thermally expandable particles is greater than the amount of the invention (greater than 10 parts by weight per 100 parts urethane resin), the solid factor was increased leading to no improvement in insulation.

Amount of a blowing agent (Examples 10-11)

When the amount of the blowing agent is regulated, more heat required for foaming the thermally expandable particles can be absorbed, and, thereby, the expansiveness of the thermally expandable particles can increase, which can reduce the cell size.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed:

1. Rigid polyurethane foam comprising thermally expanded particles which are displaced during foaming to penetrate a strut of a structure of the polyurethane foam so that the particles are exposed into one or more cells of the polyurethane foam, wherein the rigid polyurethane foam comprises said thermally expanded particles in an amount of about 0.5 to about 10 parts by weight per 100 parts by weight of urethane resin forming the polyurethane foam, and wherein the mean diameter of the cells of the polyurethane foam is about 100 to about 350 μm.

2. The rigid polyurethane foam of claim 1, wherein the thermally expanded particles comprise hollow thermally expanded particles which are displaced during foaming to penetrate a surface of a cell in the polyurethane foam so that the particles are exposed into one or more cells of the polyurethane foam.

3. The rigid polyurethane foam of claim 1, wherein the cells of the polyurethane foam are formed by foaming a non-encapsulated blowing agent.

4. The rigid polyurethane foam of claim 3, wherein the weight ratio between the non-encapsulated blowing agent and the thermally expanded particles is about 1:0.2 to about 1:2.

5. The rigid polyurethane foam of claim 1, wherein the mean volume diameter of the thermally expandable particles before being foamed is about 5 to about 40 μm.

6. The rigid polyurethane foam of claim 1, wherein the thermally expanded particles are derived from thermally expandable polymer particles containing an encapsulated hydrocarbon based foaming agent, wherein the boiling point of the hydrocarbon based foaming agent is about −10 to about 50° C. and wherein the glass transition temperature (Tg) of the polymer particles is about 40 to about 100° C.

7. The rigid polyurethane foam of claim 6, wherein the expansion starting temperature (Tstart) of the thermally expandable particles is 50 to 110° C. and the maximum expansion temperature (Tmax) of the thermally expandable particles is 60 to 140° C.

8. The rigid polyurethane foam of claim 7, wherein the maximum expansion temperature (Tmax) of the thermally expandable particles is 70 to 120° C.

9. The rigid polyurethane foam of claim 3, wherein the non-encapsulated blowing agent comprises a hydrocarbon based foaming agent, a physical blowing agent, a chemical blowing agent, or a mixture of two or more thereof.

10. The rigid polyurethane foam of claim 9, wherein the non-encapsulated blowing agent comprises iso-pentane, cyclopentane, normal pentane, methylene chloride, hexane, acetone, water, or a mixture thereof.

11. A method for preparing a rigid polyurethane foam, comprising:
dispersing thermally expandable particles in a polyol mixture including a dispersing agent, a catalyst and water;
adding a non-encapsulated blowing agent to the polyol mixture including the thermally expandable particles dispersed therein; and
reacting isocyanate and the polyol mixture including the thermally expandable particles and the non-encapsulated blowing agent to form a rigid polyurethane foam,
wherein the thermally expandable particles are displaced during foaming to penetrate a strut of a structure of the polyurethane foam so that the particles are exposed into one or more cells of the polyurethane foam,
wherein the amount of the thermally expandable particles is about 0.5 to about 10 parts by weight per 100 parts by weight of the urethane resin,
wherein the mixture weight ratio between the non-encapsulated blowing agent and the thermally expandable particles is about 1:0.2 to about 1:2, and
wherein the mean diameter of the cells of the polyurethane foam is about 100 to about 350 μm.

12. The method for preparing a rigid polyurethane foam of claim 11, wherein the mean volume diameter of the thermally expandable particles before being foamed is about 5 to about 40 μm.

13. The method for preparing a rigid polyurethane foam of claim 11, wherein the thermally expandable particles are polymer particles including an encapsulated hydrocarbon based foaming agent, wherein the boiling point of the hydrocarbon based foaming agent is about −10 to about 50° C. and wherein the glass transition temperature (Tg) of the polymer particles is about 40 to about 100° C.

14. The method for preparing a rigid polyurethane foam of claim 11, wherein the non-encapsulated blowing agent comprises a hydrocarbon foaming agent, a physical blowing agent, a chemical blowing agent, or a mixture of two or more thereof.

15. The method for preparing a rigid polyurethane foam of claim 14, wherein the non-encapsulated blowing agent comprises iso-pentane, cyclopentane, normal pentane, methylene chloride, hexane, acetone, water, or a mixture thereof.

16. The method for preparing a rigid polyurethane foam of claim 15, wherein the non-encapsulated blowing agent comprises iso-pentane, cyclopentane, normal pentane, methylene or a mixture thereof.

17. An insulating material for a refrigerator comprising the rigid polyurethane foam of claim 1.

18. The rigid polyurethane foam of claim 1, wherein the rigid polyurethane foam comprises said thermally expanded particles in an amount of about 0.5 to about 9 parts by weight per 100 parts by weight of urethane resin forming the polyurethane foam.

19. The rigid polyurethane foam of claim 1, wherein the rigid polyurethane foam comprises said thermally expanded particles in an amount of about 0.5 to about 7 parts by weight per 100 parts by weight of urethane resin forming the polyurethane foam.

20. The rigid polyurethane foam of claim 1, wherein the rigid polyurethane foam comprises said thermally expanded particles in an amount of about 0.5 to about 5 parts by weight per 100 parts by weight of urethane resin forming the polyurethane foam.

21. The rigid polyurethane foam of claim 1, wherein the mean diameter of the cells of the polyurethane foam is about 250 to about 325 μm.

22. The rigid polyurethane foam of claim 1, wherein the rigid polyurethane foam has a K-factor of about 150 to about 170 $10^{-4}$ kcal/m·h·° C.

23. The rigid polyurethane foam of claim 1, wherein the rigid polyurethane foam comprises said thermally expanded particles in an amount of about 2 to about 8 parts by weight per 100 parts by weight of urethane resin forming the polyurethane foam.

* * * * *